(12) United States Patent
Dennis

(10) Patent No.: US 11,206,325 B1
(45) Date of Patent: Dec. 21, 2021

(54) HANDS FREE TELEPHONE ASSEMBLY

(71) Applicant: Paul Dennis, Ft Worth, TX (US)

(72) Inventor: Paul Dennis, Ft Worth, TX (US)

( * ) Notice: Subject to any disclaimer, the term of this patent is extended or adjusted under 35 U.S.C. 154(b) by 0 days.

(21) Appl. No.: 17/243,686

(22) Filed: Apr. 29, 2021

(51) Int. Cl.
*H04M 1/02* (2006.01)
*H04M 1/04* (2006.01)
*H04B 1/3827* (2015.01)

(52) U.S. Cl.
CPC ....... *H04M 1/0272* (2013.01); *H04M 1/0279* (2013.01); *H04M 1/04* (2013.01); *H04B 1/385* (2013.01); *H04M 2250/54* (2013.01)

(58) Field of Classification Search
CPC .... H04M 1/0272; H04M 1/0279; H04M 1/04; H04M 2250/54; H04B 1/385
See application file for complete search history.

(56) References Cited

U.S. PATENT DOCUMENTS

| | | | |
|---|---|---|---|
| 5,113,428 A | 5/1992 | Fitzgerald | |
| 5,793,865 A | 8/1998 | Leifer | |
| 7,072,696 B2 | 7/2006 | Shaft | |
| 7,133,002 B2 * | 11/2006 | Langlois | G09F 21/02 345/8 |
| 7,328,048 B2 | 2/2008 | Levy | |
| 7,508,932 B1 | 3/2009 | Bergh | |
| D594,442 S | 6/2009 | Chon et al. | |
| 9,699,281 B2 * | 7/2017 | Fisher | H04M 1/0216 |
| 9,826,803 B2 * | 11/2017 | Anderson | G06F 1/1639 |
| 10,139,854 B2 * | 11/2018 | Krishnakumar | G06F 1/1601 |
| 10,644,543 B1 * | 5/2020 | Pang | H02J 50/40 |
| 10,790,700 B2 * | 9/2020 | Owens | H02J 50/005 |
| 10,895,762 B2 * | 1/2021 | Owens | G02C 11/10 |
| 2005/0056105 A1 * | 3/2005 | Delacroix | G21C 17/017 73/865.8 |
| 2005/0251395 A1 * | 11/2005 | Lich | G02B 27/01 704/275 |
| 2007/0229650 A1 * | 10/2007 | McKay | G06F 3/017 348/14.01 |
| 2009/0295712 A1 * | 12/2009 | Ritzau | H04N 9/3194 345/156 |
| 2015/0277841 A1 * | 10/2015 | Lanier | G06F 3/014 345/428 |
| 2016/0178906 A1 * | 6/2016 | Rider | G06F 3/017 726/17 |
| 2017/0017451 A1 * | 1/2017 | Sathyanarayana Raghu | H04B 1/385 |

(Continued)

FOREIGN PATENT DOCUMENTS

WO   WO 2010099453   9/2010

*Primary Examiner* — Lewis G West

(57) ABSTRACT

A hands free telephone assembly for hands free use of a personal electronic device includes a collar is curved into an open loop for wearing around a neck of a user. A communication unit is integrated into the collar and the communication unit is in remote communication with a personal electronic device to facilitate voice control of the personal electronic device. A video projector is integrated into the collar to project digital images received from the personal electronic device. The video projector has motion sensing capabilities thereby facilitating the personal electronic device to be controlled with hand motions. A projection screen is held by the user thereby facilitating the projection screen to display the digital images received from the personal electronic device.

9 Claims, 5 Drawing Sheets

(56) References Cited

U.S. PATENT DOCUMENTS

| | | | |
|---|---|---|---|
| 2017/0231337 A1* | 8/2017 | Anderson | G03B 21/145 63/3 |
| 2021/0166346 A1* | 6/2021 | Kim | G06N 3/0454 |

* cited by examiner

HANDS FREE TELEPHONE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hands free devices and more particularly pertains to a new hands free device to facilitate hands free use of a personal electronic device. The device includes a collar that is worn around a user's neck, and a video projector that is integrated into the collar. The collar is in wireless communication with a personal electronic device and the video projector projects images from the personal electronic device onto a hand held projection screen.

(2) Description of Related Art Including Information Disclosed Under 37 CFR 1.97 and 1.98

The prior art relates to hands free device including a variety of headset devices that includes a pair of ear phones for wireless connecting to a personal electronic device. Additionally, the prior art discloses a variety of eyewear devices that wirelessly connect to a personal electronic device for displaying imagery from the personal electronic device. In no instance does the prior art disclose a collar that is worn around a user's neck which has video projection capabilities for projecting images received from a personal electronic device.

BRIEF SUMMARY OF THE INVENTION

An embodiment of the disclosure meets the needs presented above by generally comprising a collar is curved into an open loop for wearing around a neck of a user. A communication unit is integrated into the collar and the communication unit is in remote communication with a personal electronic device to facilitate voice control of the personal electronic device. A video projector is integrated into the collar to project digital images received from the personal electronic device. The video projector has motion sensing capabilities thereby facilitating the personal electronic device to be controlled with hand motions. A projection screen is held by the user thereby facilitating the projection screen to display the digital images received from the personal electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
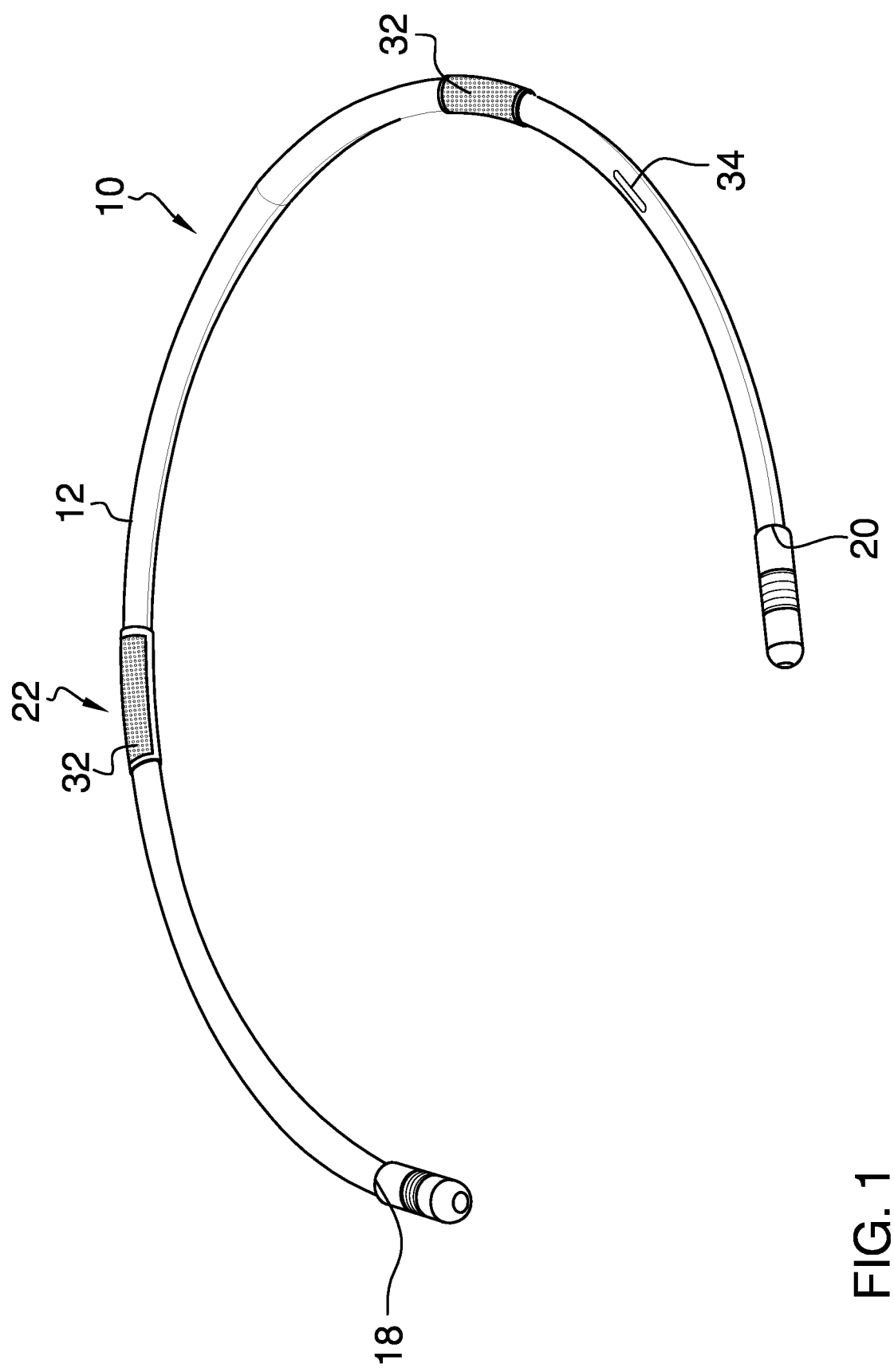
FIG. 1 is a perspective view of a collar of a hands free telephone assembly according to an embodiment of the disclosure.
Figure 2:
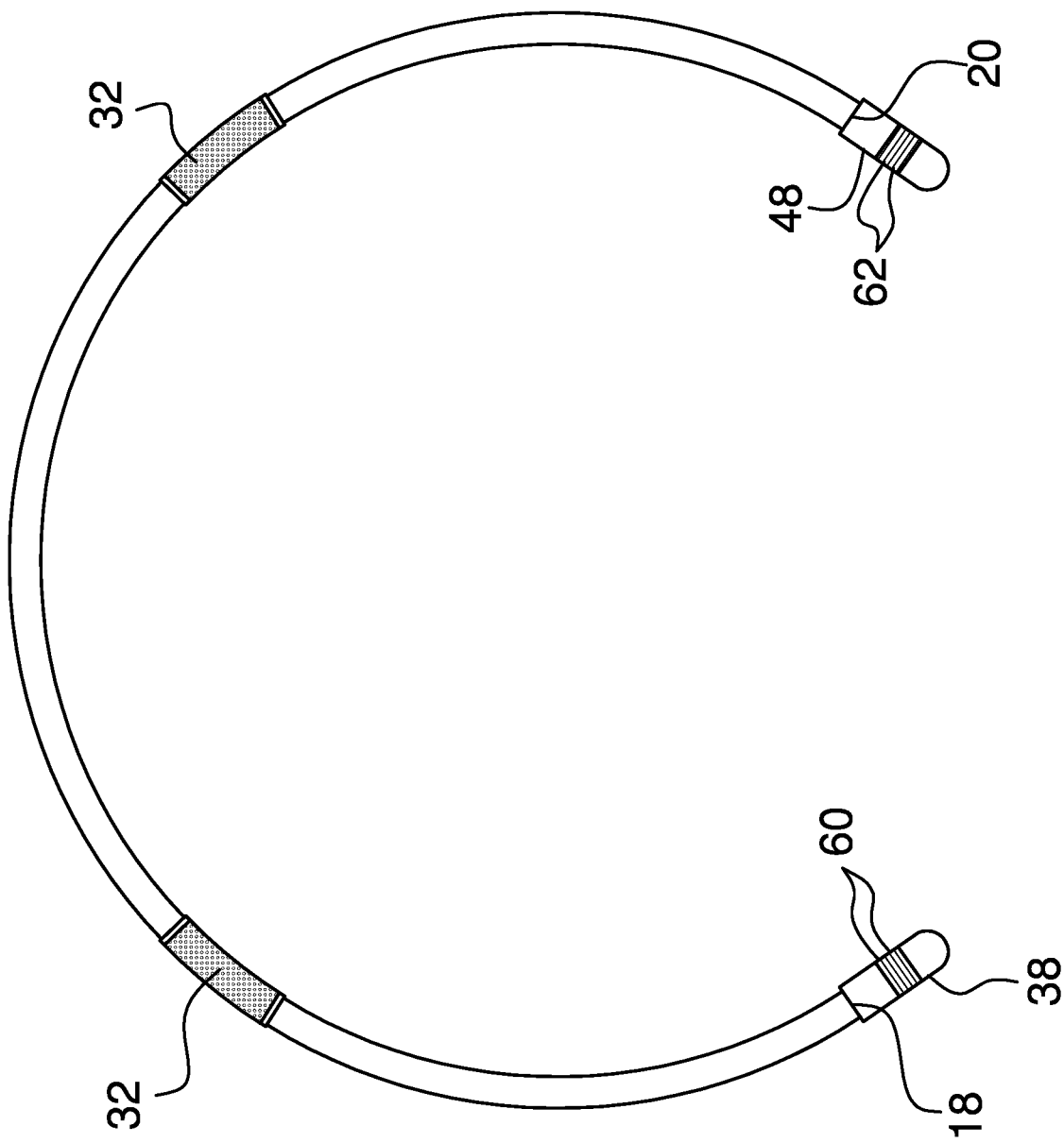
FIG. 2 is a top view of a collar of an embodiment of the disclosure.
Figure 3:
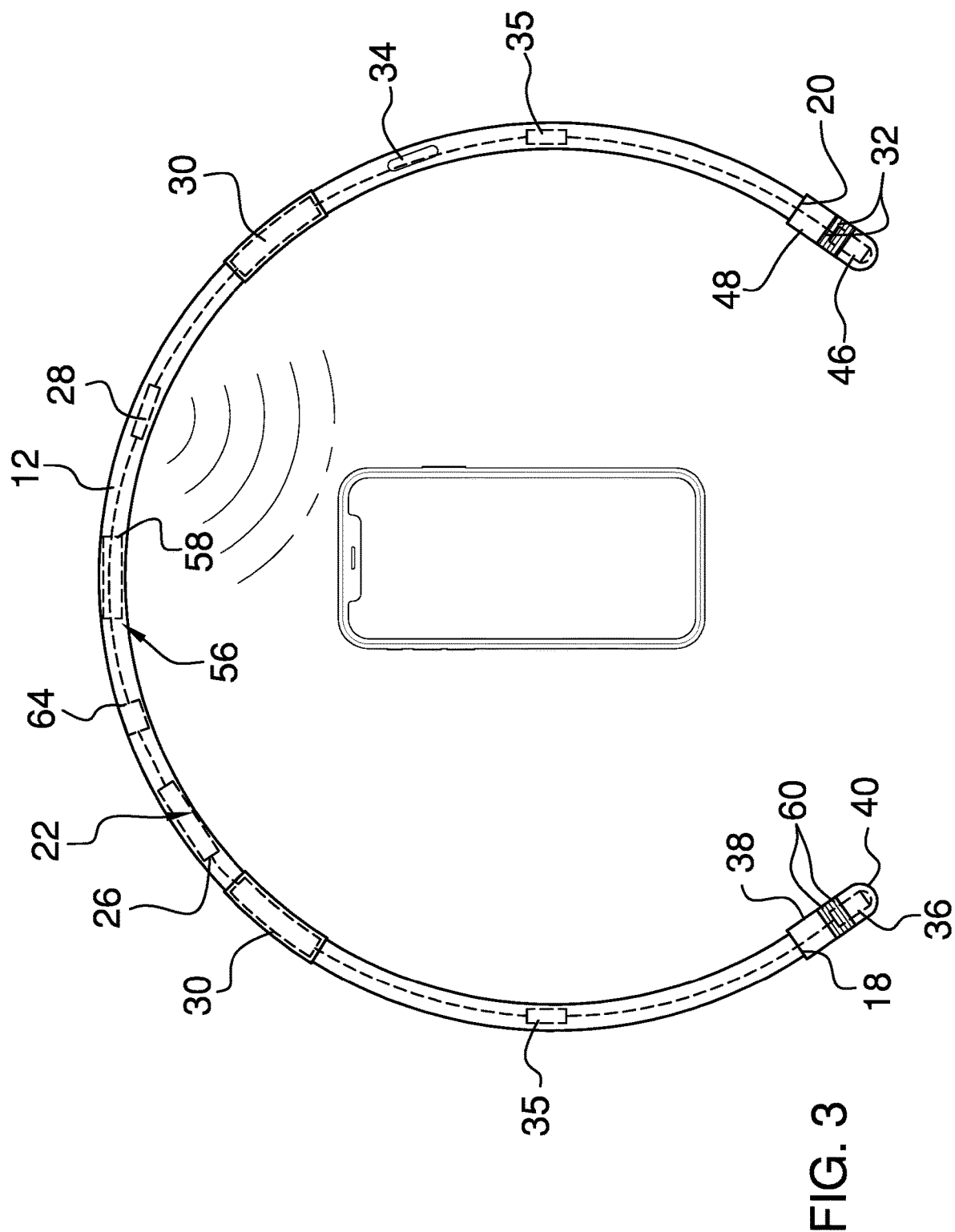
FIG. 3 is a bottom phantom view of a collar of an embodiment of the disclosure.
Figure 4:
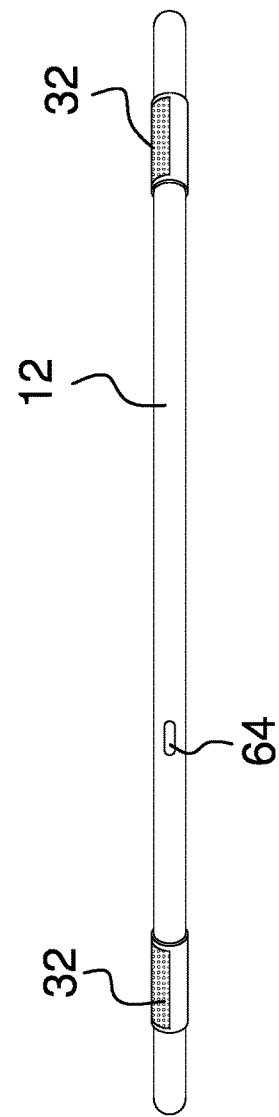
FIG. 4 is a back view of a collar of an embodiment of the disclosure.
Figure 5:
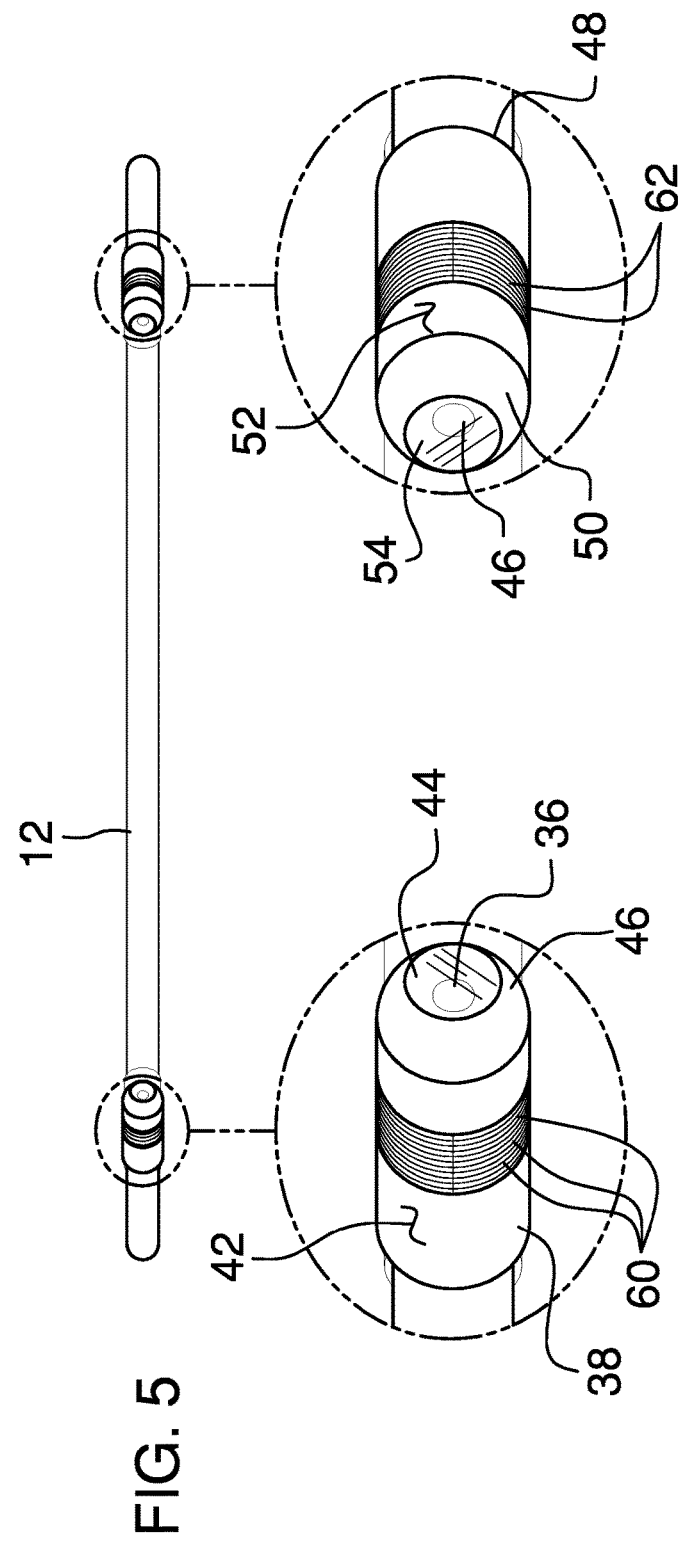
FIG. 5 is a front view of a collar of an embodiment of the disclosure.
Figure 6:
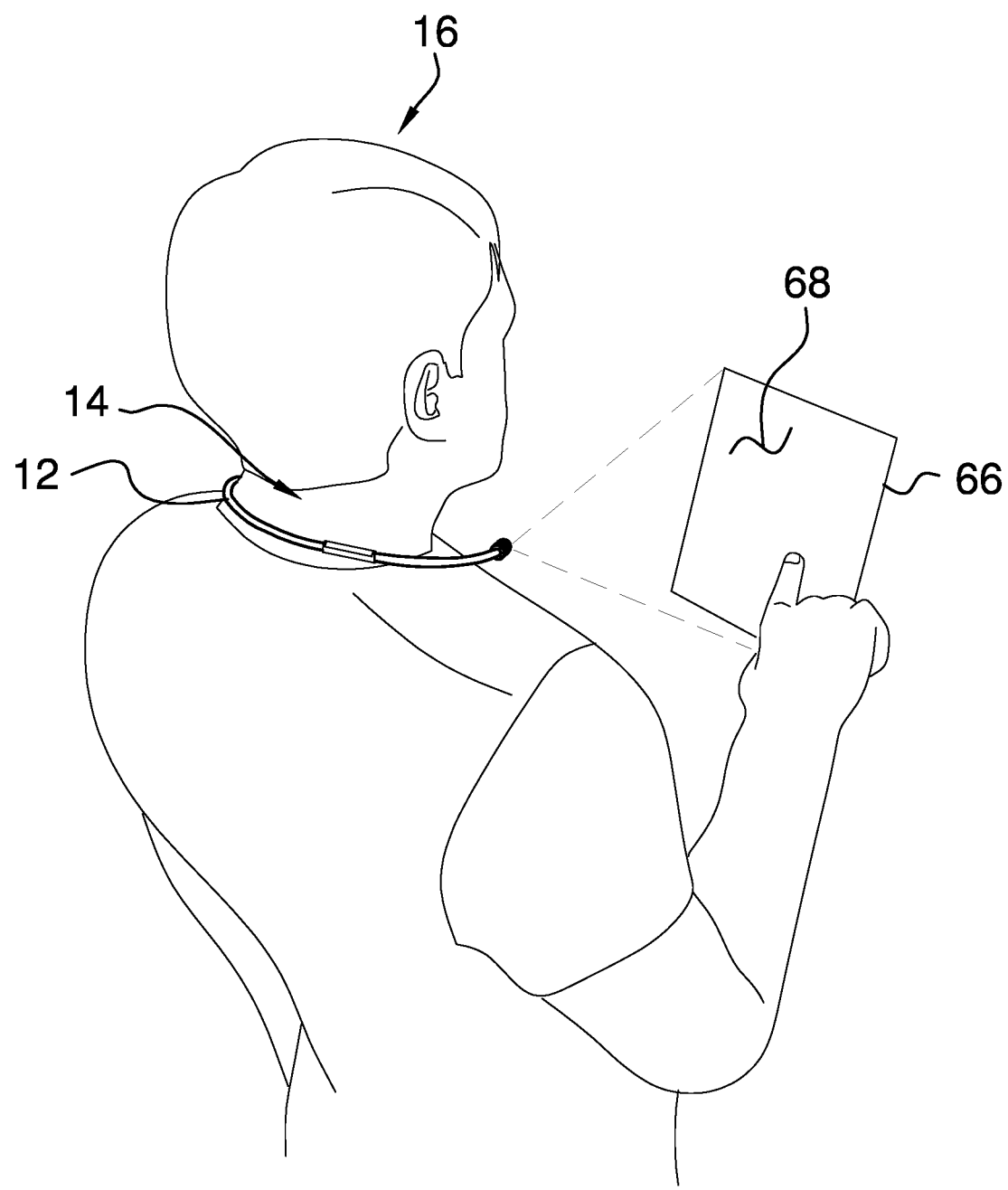
FIG. 6 is a perspective in-use view of an embodiment of the disclosure.

With reference now to the drawings, and in particular to FIGS. 1 through 6 thereof, a new hands free device embodying the principles and concepts of an embodiment of the disclosure and generally designated by the reference numeral 10 will be described.

As best illustrated in FIGS. 1 through 6, the hands free telephone assembly 10 generally comprises a collar 12 that is curved into an open loop such that the collar 12 can be worn around a neck 14 of a user 16. The collar 12 has a first end 18 and a second end 20, and the collar 12 is elongated between the first end 18 and the second end 20. Moreover, the collar 12 is curved between the first end 18 and the second end 20 such that the first end 18 is spaced from the second end 20. In this way each of the first end 18 and the second end 20 can be directed forwardly from the user 16 when the user 16 wears the collar 12 around the user 16's neck 14.

A communication unit 22 is integrated into the collar 12 and the communication unit 22 is in remote communication with a personal electronic device 24. The personal electronic device 24 may be a smart phone or other similar device that has video streaming capabilities. Additionally, the communication unit 22 receives voice commands from the user 16 to facilitate voice control of the personal electronic device 24. In this way the user 16 can control the personal electronic device 24 in a hands free manner. The personal electronic device 24 might store operational software to facilitate voice control of phone calls, video conferencing and various other operational parameters of the personal electronic device 24. The operational software might also include hand gesture recognition for employing hand gestures to control operational parameters of the personal electronic device 24. Additionally, the communication unit 22 receives data from the personal electronic device 24, including but not being limited to, streaming video and telephone calls.

The communication unit 22 comprises a control circuit 26 that is integrated into the collar 12. The communication unit 22 includes a transceiver 28 that is integrated into the collar 12 and the transceiver 28 is electrically coupled to the control circuit 26. The transceiver 28 is in communication with the personal electronic device 24 to receive audio and video data from the personal electronic device 24. Additionally, the transceiver 28 may be a radio frequency transceiver or the like and the transceiver 28 may employ Bluetooth communication protocols.

The communication unit 22 includes a pair of speakers 30 that is each integrated into the collar 12 to emit audible sound outwardly therefrom. Each of the speakers 30 is electrically coupled to the control circuit 26 to emit audible sounds received from the personal electronic device 24. Additionally, each of the speakers 30 may include a mesh screen 32 that is integrated into the collar 12 to pass the audible sound outwardly from the collar 12. The communication unit 22 includes a microphone 34 is integrated into the collar 12 to receive verbal commands from the user 16. The microphone 34 is electrically coupled to the control circuit 26 to communicate the verbal commands to the personal electronic device 24 thereby facilitating voice control of the personal electronic device 24. The microphone 34 may comprise an electronic microphone of any conventional design. A pair of vibration units 35 is each integrated into the collar 12 and each of the vibration units 35 is electrically coupled to the control circuit 26. Each of the vibration units 35 vibrates the collar 12 when the vibration units 35 are turned on to facilitate haptic feedback for the user 16. Additionally, each of the vibration units 35 is turned on when, for example, the personal electronic device 24 receives a notification of an email or a text message.

A video projector 36 is integrated into the collar 12 to project digital images outwardly from the collar 12. The video projector 36 is in electrical communication with the communication unit 22 such that the video projector 36 can protect digital images received from the personal electronic device 24. Moreover, the video projector 36 has motion sensing capabilities to sense hand motions of the user 16 thereby facilitating the personal electronic device 24 to be controlled with hand motions. The video projector 36 is positioned on the first end 18 of the collar 12 and the video projector 36 is electrically coupled to the control circuit 26. The video projector 36 may comprise a motion sensing video projector that is commonly associated with motion sensing virtual reality devices or the like.

A first housing 38 is positioned around the first end 18 of the collar 12 such that the first housing 38 surrounds the video projector 36 to protect the video projector 36. The first housing 38 has a distal end 40 with respect to the first end 18 and an outside surface 42. Additionally, the distal end 40 is open thereby facilitating the video projector 36 to project images outwardly through the distal end 40. A first lens 44 is positioned in the distal end 40 of the first housing 38 for protecting the video projector 36. The first lens 44 is comprised of a translucent material to facilitate imagery from the video projector 36 to pass through the first lens 44.

A light emitter 46 is integrated into the collar 12 wherein the light emitter 46 is configured to emit light outwardly therefrom for illuminating a darkened area. The light emitter 46 is positioned on the second end 20 of the collar 12 and the light emitter 46 is electrically coupled to the control circuit 26. The light emitter 46 may comprise a light emitting diode or other type of electronic light emitter.

A second housing 48 is positioned around the second end 20 of the collar 12 such that the second housing 48 surrounds the light emitter 46 to protect the light emitter 46. The second housing 48 has a distal end 50 with respect to the second end 20 and an outside surface 52, and the distal end 50 of the second housing 48 is open thereby facilitating the light emitter 46 to emit light outwardly through the distal end 50 of the second housing 48. A second lens 54 is positioned in the distal end 50 of the second housing 48 for protecting the light emitter 46. The second lens 54 is comprised of a translucent material to pass light from the light emitter 46 through the second lens 54.

A power supply 56 is integrated into the collar 12 and the power supply 56 is electrically coupled to the control circuit 26. The power supply 56 comprises a battery 58 that is positioned within the collar 12 and the battery 58 is electrically coupled to the control circuit 26. The power supply 56 further includes a set of first rings 60 that is each integrated into the outside surface 42 of the first housing 38 such that each of the first rings 60 can be exposed to sunlight. Moreover, each of the first rings 60 is comprised of a photovoltaic material to convert sunlight into electrical current. Each of the first rings 60 is electrically coupled to the battery 58 for charging the battery 58.

The power supply 56 includes a set of second rings 62 that is each integrated into the outside surface 52 of the second housing 48 such that each of the second rings 62 can be exposed to sunlight. Each of the second rings 62 is comprised of a photovoltaic material to convert sunlight into electrical current. Additionally, each of the second rings 62 is electrically coupled to the battery 58 for charging the battery 58. The power supply 56 includes a charge port 64 that is recessed into the collar 12 to insertably receive a charge cord. The charge port 64 is electrically coupled to the battery 58 for charging the battery 58.

A projection screen 66 is included that can be held by the user 16 thereby facilitating the projection screen 66 to be positioned in front of the video projector 36. In this way the projection screen 66 can display the digital images received from the personal electronic device 24. The projection screen 66 has a first surface 68 and the first surface 68 is comprised of a light reflecting surface to render the digital images from the video projector 36. Additionally, the projection screen 66 may have a width of approximately 8.0 inches and a height of approximately 11.0 inches.

In use, the transceiver 28 is synched with the personal electronic device 24 to facilitate the personal electronic device 24 to be controlled with voice commands received by the microphone 34 in the collar 12. Additionally, the transceiver 28 facilitates the video projector 36 to project the digital images onto the projection screen 66. In this way the overall size of the display is increased with respect to the personal electronic device 24. The speakers 30 and the microphone 34 facilitate phone calls to be placed with the collar 12.

The user 16 can employ hand gestures to manipulate the digital imagery displayed on the projection screen 66. The video projector 36 communicates the hand gestures to the personal electronic device 24 thereby facilitating the personal electronic device 24 to respond to the hand gestures. The user 16 can, for example, answer a phone call with or without imagery being displayed on the projection screen 66 through the use of spoken commands. Additionally, the voice control software may facilitate a wide variety of spoken commands to be available for controlling operational parameters of the personal electronic device 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hands free telephone assembly facilitating voice control and hand motion control of a smart device, said assembly comprising:
   a collar being curved into an open loop wherein said collar is configured to be worn around a neck of a user;
   a communication unit being integrated into said collar, said communication unit being in remote communication with a personal electronic device, said communication unit receiving voice commands from the user wherein said communication unit is configured to facilitate voice control of the personal electronic device, said communication unit receiving data from the personal electronic device;
   a video projector being integrated into said collar wherein said video projector is configured to project digital images outwardly from said collar, said video projector being in electrical communication with said communication unit wherein said video projector is configured to project digital images received from the personal electronic device, said video projector having motion sensing capabilities wherein said video projector is configured to sense hand motions of the user thereby facilitating the personal electronic device to be controlled with hand motions;
   a light emitter being integrated into said collar wherein said light emitter is configured to emit light outwardly therefrom for illuminating a darkened area; and
   a projection screen being held by the user thereby facilitating said projection screen to be positioned in front of said video projector wherein said projection screen is configured to display the digital images received from the personal electronic device.

2. The assembly according to claim 1, wherein:
   said collar has a first end and a second end, said collar being elongated between said first end and said second end, said collar being curved between said first end and said second end such that said first end is spaced from said second end wherein each of said first end and said second end are configured to be directed forwardly from the user when the user wears said collar around the user's neck;
   said video projector is positioned on said first end of said collar; and
   said light emitter is positioned on said second end of said collar.

3. The assembly according to claim 2, wherein said communication unit comprises:
   a control circuit being integrated into said collar;
   a transceiver being integrated into said collar, said transceiver being electrically coupled to said control circuit, said transceiver being in communication with the personal electronic device wherein said control circuit is configured to receive audio and video data from the personal electronic device;
   a pair of speakers, each of said speakers being integrated into said collar wherein each of said speakers is configured to emit audible sound outwardly therefrom, each of said speakers being electrically coupled to said control circuit wherein said speakers are configured to emit audible sounds received from the personal electronic device; and
   a microphone being integrated into said collar wherein said microphone is configured to receive verbal commands from the user, said microphone being electrically coupled to said control circuit wherein said transceiver is configured to communicate the verbal commands to the personal electronic device thereby facilitating voice control of the personal electronic device.

4. The assembly according to claim 3, further comprising a first housing being positioned around said first end of said collar such that said first housing surrounds said video projector thereby facilitating said first housing to protect said video projector, said first housing having a distal end with respect to said first end and an outside surface, said distal end being open thereby facilitating said video projector to project images outwardly through said distal end.

5. The assembly according to claim 4, further comprising a first lens being positioned in said distal end of said first housing for protecting said video projector, said first lens being comprised of a translucent material wherein said first lens is configure to facilitate imagery from said video projector to pass through said first lens.

6. The assembly according to claim 3, further comprising:
   a first housing being positioned around said first end of said collar; and
   a second housing being positioned around said second end of said collar such that said second housing surrounds said light emitter thereby facilitating said second housing to protect said light emitter, said second housing having a distal end with respect to said second end and an outside surface, said distal end of said second housing being open thereby facilitating said light emitter to emit light outwardly through said distal end of said second housing.

7. The assembly according to claim 6, further comprising:
   a first lens being positioned in said first housing; and
   a second lens being positioned in said distal end of said second housing for protecting said light emitter, said second lens being comprised of a translucent material wherein said second lens is configured to pass light from said light emitter through said second lens.

8. A hands free telephone assembly facilitating voice control and hand motion control of a smart device, said assembly comprising:

a collar being curved into an open loop wherein said collar is configured to be worn around a neck of a user, said collar having a first end and a second end, said collar being elongated between said first end and said second end, said collar being curved between said first end and said second end such that said first end is spaced from said second end wherein each of said first end and said second end are configured to be directed forwardly from the user when the user wears said collar around the user's neck;

a communication unit being integrated into said collar, said communication unit being in remote communication with a personal electronic device, said communication unit receiving voice commands from the user wherein said communication unit is configured to facilitate voice control of the personal electronic device, said communication unit receiving data from the personal electronic device, said communication unit comprising:

a control circuit being integrated into said collar;

a transceiver being integrated into said collar, said transceiver being electrically coupled to said control circuit, said transceiver being in communication with the personal electronic device wherein said control circuit is configured to receive audio and video data from the personal electronic device;

a pair of speakers, each of said speakers being integrated into said collar wherein each of said speakers is configured to emit audible sound outwardly therefrom, each of said speakers being electrically coupled to said control circuit wherein said speakers are configured to emit audible sounds received from the personal electronic device; and a microphone being integrated into said collar wherein said microphone is configured to receive verbal commands from the user, said microphone being electrically coupled to said control circuit wherein said transceiver is configured to communicate the verbal commands to the personal electronic device thereby facilitating voice control of the personal electronic device;

a video projector being integrated into said collar wherein said video projector is configured to project digital images outwardly from said collar, said video projector being in electrical communication with said communication unit wherein said video projector is configured to project digital images received from the personal electronic device, said video projector having motion sensing capabilities wherein said video projector is configured to sense hand motions of the user thereby facilitating the personal electronic device to be controlled with hand motions, said video projector being positioned on said first end of said collar, said video projector being electrically coupled to said control circuit;

a first housing being positioned around said first end of said collar such that said first housing surrounds said video projector thereby facilitating said first housing to protect said video projector, said first housing having a distal end with respect to said first end and an outside surface, said distal end being open thereby facilitating said video projector to project images outwardly through said distal end;

a first lens being positioned in said distal end of said first housing for protecting said video projector, said first lens being comprised of a translucent material wherein said first lens is configure to facilitate imagery from said video projector to pass through said first lens;

a light emitter being integrated into said collar wherein said light emitter is configured to emit light outwardly therefrom for illuminating a darkened area, said light emitter being positioned on said second end of said collar, said light emitter being electrically coupled to said control circuit;

a second housing being positioned around said second end of said collar such that said second housing surrounds said light emitter thereby facilitating said second housing to protect said light emitter, said second housing having a distal end with respect to said second end and an outside surface, said distal end of said second housing being open thereby facilitating said light emitter to emit light outwardly through said distal end of said second housing;

a second lens being positioned in said distal end of said second housing for protecting said light emitter, said second lens being comprised of a translucent material wherein said second lens is configured to pass light from said light emitter through said second lens;

a power supply being integrated into said collar, said power supply being electrically coupled to said control circuit, said power supply comprising:

a battery being positioned within said collar, said battery being electrically coupled to said control circuit;

a set of first rings, each of said first rings being integrated into said outside surface of said first housing wherein each of said first rings is configured to be exposed to sunlight, each of said first rings being comprised of a photovoltaic material wherein each of said first rings is configured to convert sunlight into electrical current, each of said first rings being electrically coupled to said battery for charging said battery;

a set of second rings, each of said second rings being integrated into said outside surface of said second housing wherein each of said second rings is configured to be exposed to sunlight, each of said second rings being comprised of a photovoltaic material wherein each of said second rings is configured to convert sunlight into electrical current, each of said second rings being electrically coupled to said battery for charging said battery; and a charge port being recessed into said collar wherein said charge port is configured to insertably receive a charge cord, said charge port being electrically coupled to said battery for charging said battery; and a projection screen being held by the user thereby facilitating said projection screen to be positioned in front of said video projector wherein said projection screen is configured to display the digital images received from the personal electronic device, said projection screen having a first surface, said first surface being comprised of a light reflecting surface wherein said first surface is configured to render the digital images from said video projector.

9. A hands free telephone system facilitating voice control and hand motion control of a smart device, said system comprising:
- a personal electronic device having video streaming capabilities;
- a collar being curved into an open loop wherein said collar is configured to be worn around a neck of a user, said collar having a first end and a second end, said collar being elongated between said first end and said second end, said collar being curved between said first end and said second end such that said first end is spaced from said second end wherein each of said first end and said second end are configured to be directed forwardly from the user when the user wears said collar around the user's neck;
- a communication unit being integrated into said collar, said communication unit being in remote communication with said personal electronic device, said communication unit receiving voice commands from the user to facilitate voice control of said personal electronic device, said communication unit receiving data from said personal electronic device, said communication unit comprising:
  - a control circuit being integrated into said collar;
  - a transceiver being integrated into said collar, said transceiver being electrically coupled to said control circuit, said transceiver being in communication with said personal electronic device to receive audio and video data from said personal electronic device;
  - a pair of speakers, each of said speakers being integrated into said collar wherein each of said speakers is configured to emit audible sound outwardly therefrom, each of said speakers being electrically coupled to said control circuit wherein said speakers are configured to emit audible sounds received from said personal electronic device; and
  - a microphone being integrated into said collar wherein said microphone is configured to receive verbal commands from the user, said microphone being electrically coupled to said control circuit wherein said transceiver to communicate the verbal commands to said personal electronic device thereby facilitating voice control of said personal electronic device;
- a video projector being integrated into said collar wherein said video projector is configured to project digital images outwardly from said collar, said video projector being in electrical communication with said communication unit to project digital images received from the personal electronic device, said video projector having motion sensing capabilities wherein said video projector is configured to sense hand motions of the user thereby facilitating the personal electronic device to be controlled with hand motions, said video projector being positioned on said first end of said collar, said video projector being electrically coupled to said control circuit;
- a first housing being positioned around said first end of said collar such that said first housing surrounds said video projector thereby facilitating said first housing to protect said video projector, said first housing having a distal end with respect to said first end and an outside surface, said distal end being open thereby facilitating said video projector to project images outwardly through said distal end;
- a first lens being positioned in said distal end of said first housing for protecting said video projector, said first lens being comprised of a translucent material wherein said first lens is configure to facilitate imagery from said video projector to pass through said first lens;
- a light emitter being integrated into said collar wherein said light emitter is configured to emit light outwardly therefrom for illuminating a darkened area, said light emitter being positioned on said second end of said collar, said light emitter being electrically coupled to said control circuit;
- a second housing being positioned around said second end of said collar such that said second housing surrounds said light emitter thereby facilitating said second housing to protect said light emitter, said second housing having a distal end with respect to said second end and an outside surface, said distal end of said second housing being open thereby facilitating said light emitter to emit light outwardly through said distal end of said second housing;
- a second lens being positioned in said distal end of said second housing for protecting said light emitter, said second lens being comprised of a translucent material wherein said second lens is configured to pass light from said light emitter through said second lens;
- a power supply being integrated into said collar, said power supply being electrically coupled to said control circuit, said power supply comprising:
  - a battery being positioned within said collar, said battery being electrically coupled to said control circuit;
  - a set of first rings, each of said first rings being integrated into said outside surface of said first housing wherein each of said first rings is configured to be exposed to sunlight, each of said first rings being comprised of a photovoltaic material wherein each of said first rings is configured to convert sunlight into electrical current, each of said first rings being electrically coupled to said battery for charging said battery;
  - a set of second rings, each of said second rings being integrated into said outside surface of said second housing wherein each of said second rings is configured to be exposed to sunlight, each of said second rings being comprised of a photovoltaic material wherein each of said second rings is configured to convert sunlight into electrical current, each of said second rings being electrically coupled to said battery for charging said battery; and
  - a charge port being recessed into said collar wherein said charge port is configured to insertably receive a charge cord, said charge port being electrically coupled to said battery for charging said battery; and
- a projection screen being held by the user thereby facilitating said projection screen to be positioned in front of said video projector wherein said projection screen is configured to display the digital images received from the personal electronic device, said projection screen having a first surface, said first surface being comprised of a light reflecting surface wherein said first surface is configured to render the digital images from said video projector.

* * * * *